J. A. BRAGAW.
Cork-Screws.
No. 149,983. Patented April 21, 1874.
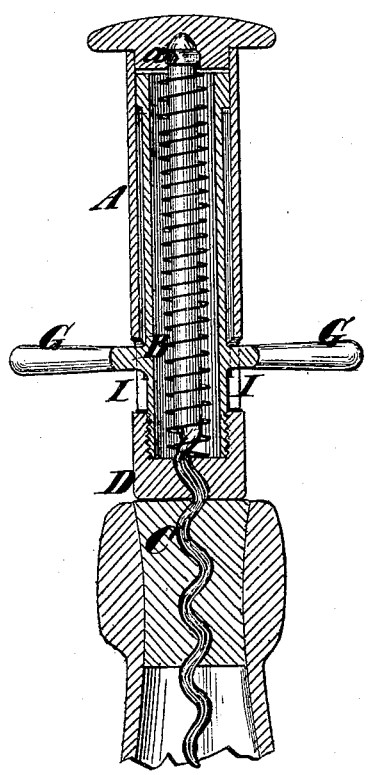
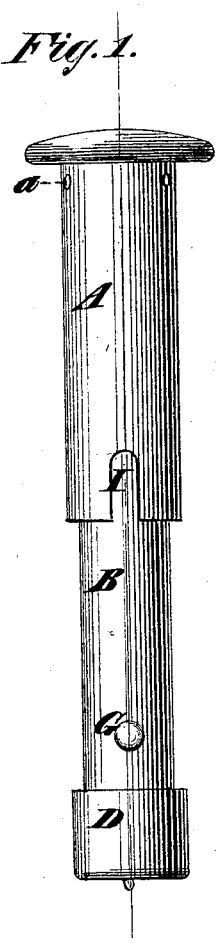

UNITED STATES PATENT OFFICE.

JOHN A. BRAGAW, OF KINGSTON, NEW YORK.

IMPROVEMENT IN CORK-SCREWS.

Specification forming part of Letters Patent No. 149,983, dated April 21, 1874; application filed March 10, 1874.

*To all whom it may concern:*

Be it known that I, JOHN A. BRAGAW, of Kingston, in the county of Ulster and State of New York, have invented an Improved Cork-Screw, of which the following is a specification:

The case of this cork-screw consists of two shells, one of which slides on the other, and has the screw fastened within it in such manner that it may turn within a nut on the end of the inner shell when the outer shell is worked on it. A spring fitting between the ends of the two shells forces the outer one back after the article is used, so that the screw is drawn within the inner shell, and is thereby shielded so that it may be carried in the pocket. To draw a cork with this improved cork-screw a pair of handles on the inner shell are grasped to keep it from turning, and the upper shell is pushed down so as to force the screw through the nut into the cork. A simple pull will then remove the cork. Afterward the handles are grasped in one hand, while the outer shell is held in the other, and then a pull draws the screw through the nut within the shells composing its case, and thereby strips off the cork.

In the accompanying drawing, Figure 1 is a side view of the improved cork-screw, and Fig. 2 is a longitudinal section of the same.

Similar letters of reference indicate corresponding parts in both figures.

A and B are two telescopic shells, composing the case or handle of the implement. The screw C has its shank fastened inside the head of the outer shell A by means of a pin, *a*, passing through it and entering an annular groove in the side of the screw-shank. The screw itself works through a nut, D, arranged at the end of the inner shell, and a spiral spring, which surrounds the shank of the screw, forces the two shells apart, so that the screw is drawn within them, and thereby is prevented from doing injury when carried in the pocket. On the outside of the inner shell, a short distance from its outer end, there are two handles, G G, and in the adjacent edges of the outer shell are two notches, I I, which accommodate these arms when the outer shell is forced down on the other in the operation of the cork-screw.

To draw a cork with this implement, the handles G G are grasped by the fingers, and the tip of the screw is placed on the cork. Then the outer shell is forced down by the palm of the hand to cause the screw to work through the nut, and by the rotary motion thereby imparted to it to enter the cork. When the screw is in place a pull on the handles, while the outer shell is still held down, will withdraw the cork. To remove the cork from the screw the outer shell is held in one hand and the handles are pulled away from it to draw the screw within the inner shell, and the cork being thereby pulled against the nut is held from turning, so that the turning of the screw, caused by the nut, unscrews it from the cork, and then, as the shell covers the screw, it shields it and prevents it from occasioning injury to the pocket, or other place where it is put.

The handles G G are arranged some distance above the outer end of the shell B, to afford room to the fingers between them, and the cork and the notches are provided in the outer shell to allow the screw enough longitudinal motion to enter the largest cork.

What I claim as my invention is—

In combination with the outer shell A, having the notches I, fixed screw C, and spring arranged around said screw, the inner sliding shell B, having the lateral handles G, and nut D at its lower end, all being constructed to operate substantially as and for the purpose described.

J. A. BRAGAW

Witnesses:
  HENRY T. BROWN,
  MICHAEL RYAN.